(12) United States Patent
Silver

(10) Patent No.: US 9,942,194 B1
(45) Date of Patent: *Apr. 10, 2018

(54) GROUP SIGNALING USING SYNTHETIC MEDIA ACCESS CONTROL ADDRESSES

(71) Applicant: CSC Holdings, LLC, Bethpage, NY (US)

(72) Inventor: Kenneth Silver, Plainview, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,481

(22) Filed: May 16, 2017

Related U.S. Application Data

(63) Continuation of application No. 14/610,573, filed on Jan. 30, 2015, now Pat. No. 9,660,955, which is a continuation of application No. 12/845,247, filed on Jul. 28, 2010, now Pat. No. 8,964,740.

(51) Int. Cl.
*H04L 12/18* (2006.01)
*H04L 29/12* (2006.01)

(52) U.S. Cl.
CPC ...... *H04L 61/2038* (2013.01); *H04L 61/2061* (2013.01); *H04L 61/2069* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 6,205,490 B1 | 3/2001 | Karapetkov et al. | |
| 7,506,360 B1 | 3/2009 | Wilkinson et al. | |
| 7,596,808 B1 | 9/2009 | Wilkinson et al. | |
| 7,646,708 B2 | 1/2010 | McGee et al. | |
| 7,724,745 B1 | 5/2010 | Elangovan et al. | |
| 8,260,961 B1 | 9/2012 | Wilkinson et al. | |
| 8,819,285 B1* | 8/2014 | Wilkinson | H04L 63/0263 709/232 |
| 8,964,740 B2* | 2/2015 | Silver | H04L 61/2038 370/390 |
| 9,660,955 B1* | 5/2017 | Silver | H04L 61/2069 |
| 2003/0149824 A1 | 8/2003 | Smith et al. | |
| 2004/0111640 A1 | 6/2004 | Baum | |
| 2006/0045089 A1 | 3/2006 | Bacher et al. | |
| 2007/0073882 A1 | 3/2007 | Brown et al. | |
| 2007/0201468 A1 | 8/2007 | Jokela | |
| 2008/0101363 A1 | 5/2008 | Li | |
| 2008/0134291 A1 | 6/2008 | Wu et al. | |
| 2008/0232373 A1 | 9/2008 | Iyer et al. | |
| 2009/0100465 A1 | 4/2009 | Kulakowski | |
| 2012/0030291 A1 | 2/2012 | Silver | |

* cited by examiner

*Primary Examiner* — Chi H Pham
*Assistant Examiner* — Shick Hom
(74) *Attorney, Agent, or Firm* — Sterne, Kessler, Goldstein & Fox PLLC

(57) ABSTRACT

Methods, systems and computer program products to communicate using a synthetic Media Access Control (synMAC) addresses are provided. The method includes receiving a first message assigning a first synMAC address and a second synMAC address to the device and storing the first synMAC address and the second synMAC address in a memory. The method further includes receiving a second message and processing the second message when the second message includes the first synMAC address or the second synMAC address.

22 Claims, 9 Drawing Sheets

600

| synMAC | Description |
|---|---|
| 1 | Devices in Denver Office |
| 2 | Devices in Atlanta Office |
| 3 | All Printers |
| 4 | All Cable Modems |
| 5 | All Devices |
| 6 | Selected devices in Denver and selected devices in Atlanta |
| ⋮ M | ⋮ |

FIG. 6

GROUP SIGNALING USING SYNTHETIC MEDIA ACCESS CONTROL ADDRESSES

CROSS-REFERENCE TO RELATED APPLICATIONS

This application is a continuation of U.S. patent application Ser. No. 14/610,573, filed Jan. 30, 2015 (now U.S. Pat. No. 9,660,955), which is a continuation of U.S. patent application Ser. No. 12/845,247, filed Jul. 28, 2010 (now U.S. Pat. No. 8,964,740), each of which is incorporated herein by reference in its respective entirety.

BACKGROUND OF THE INVENTION

Field of the Invention

This application is generally related to group signaling using synthetic media access control addresses (synMACs).

Background Art

In conventional communication systems, each device in a group of devices has to be addressed individually using, for example, the device's unique Media Access Control (MAC) address. If the same message is to be transmitted to each device, messaging each device individually using each device's unique MAC address is both cumbersome and time consuming. For example, to update software in a million devices, each device has to be addressed individually. Therefore, current addressing schemes incur substantial overhead.

Method and systems are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 6 illustrates an example of synMAC address groupings.

The present invention will now be described with reference to the accompanying drawings. In the drawings, like reference numbers may indicate identical or functionally similar elements.

DETAILED DESCRIPTION OF THE INVENTION

Figure 1:
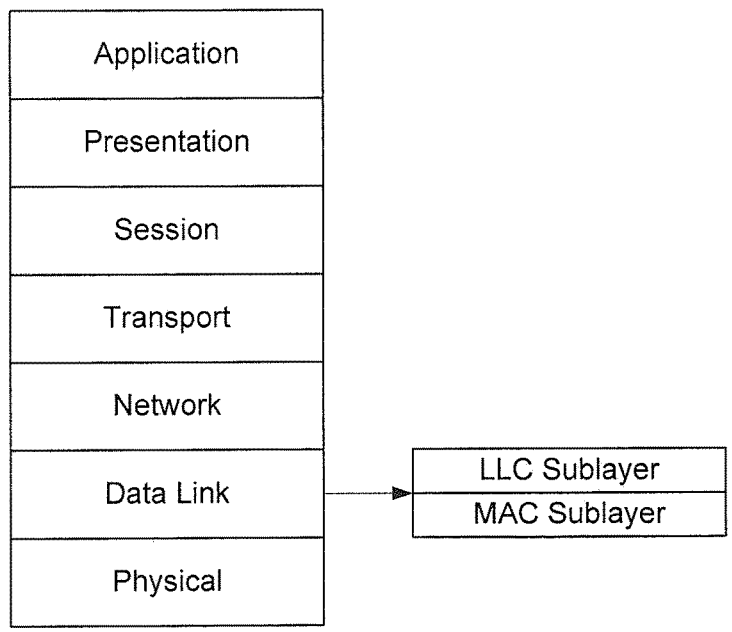
FIG. 1 illustrates an example communication model.

FIG. 1 illustrates an example communication model. Communication model 100 may be, for example, the Open System Interconnection (OSI) reference model. It is to be appreciated that the OSI model is used herein for example purposes and that any communication model may be used with the embodiments presented herein. Model 100 includes an application layer, a presentation layer, a session layer, a transport layer, a network layer, a data link layer and a physical layer. Data link layer may further include a Logical Link Control (LLC) sublayer and a Media Access Control (MAC) sublayer.

The OSI Model is an abstract description for layered communications. The application layer is the OSI layer closest to an end user. Both the OSI application layer and the user interact directly with software applications running on a processor such as processor 202 (see FIG. 2).

The Presentation Layer establishes a context between Application Layer entities in which the higher-layer entities can use different syntax and semantics.

The Session Layer controls connections between two communication devices.

The Transport Layer provides transparent transfer of data between end users, providing reliable data transfer services to the upper layers.

The Network Layer provides the functional and procedural means of transferring variable length data sequences from a source to a destination via one or more networks, while maintaining the quality of service requested by the Transport Layer. Higher level layers in the OSI model such as application layer, presentation layer, session layer, transport layer and network layer are typically software processes that may run on, for example, processor 202 of device 200 (see FIG. 2).

Figure 2:
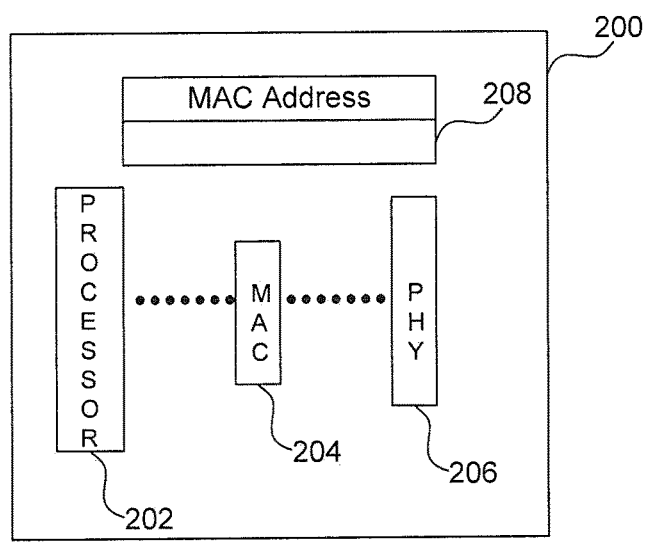
FIG. 2 illustrates an example communication system.

The Data Link Layer is the protocol layer which transfers data between adjacent network nodes in a wide area network or between nodes on the same local area network segment. The Physical Layer defines the electrical and physical specifications for devices. The physical layer is implemented by a PHY interface 206 of a device 200 as shown in FIG. 2.

The data link layer includes a MAC sublayer that provides addressing and channel access control mechanisms that allow for multiple terminals or network nodes to communicate within a multi-point network, typically a local area network (LAN) or metropolitan area network (MAN). The hardware that implements the MAC sublayer is referred to herein as a MAC interface 204 as shown in FIG. 2. MAC interface 204 may be used to filter discrete messages directed to devices using either uni-directional or bi-directional communications. Each device 200 (see FIG. 2) is assigned a unique MAC address since most protocols prohibit duplicate MAC addresses. Device 200 includes a non-volatile memory 208 that stores the unique MAC address assigned to device 200. Non-volatile memory as described herein is any type of memory that preserves stored data even when a power state of the non-volatile memory changes. Thus, for example, if device 200 is powered off and the non-volatile memory 208 loses power, it will still preserve stored data. MAC address parsing takes place at very low levels of the OSI model. For example, MAC address parsing typically occurs at the data link layer or at the network layer. In an example, embodiments of the invention utilizing synthetic MAC addresses may be implemented at the data link layer or at the network layer. Example communications between devices using MAC addresses is described below with respect to FIG. 3.

Figure 3:
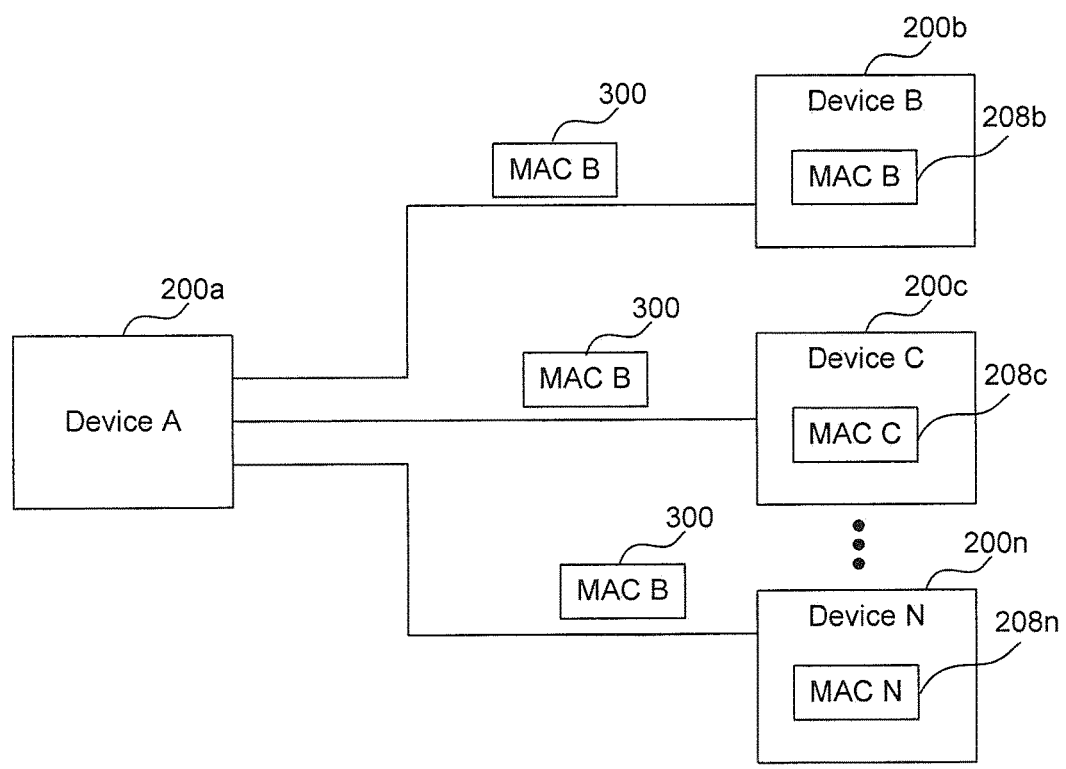
FIG. 3 illustrates an example of conventional broadcast communication.

FIG. 3 illustrates an example of conventional broadcast communication. Device 200a is coupled to devices 200b-n. Device 200a may be coupled to devices 200b-n through, including but not limited to the Internet, a Local Area Network (LAN), a wide area network (WAN) or a cable network. It is to be appreciated that the type of network in use may be arbitrary. The communication protocol in use by devices 200a-n may be, including but not limited to, one or more of, Digital Subscriber Link (DSL), Asymmetrical DSL (ADSL), Data Over Cable Service Interface Specification (DOCSIS), Ethernet or Internet Protocol (IP). It is also to be appreciated that the communication protocol in use is a design choice and may be arbitrary.

In the example in FIG. 3 of a "broadcast" system, device 200a broadcasts message 300 to each of devices 200b-n. Device 200b accepts message 300 because the MAC address in message 300 is equal to the MAC address stored in memory 208b of device 200b. Devices 200c-n reject message 300 because the MAC address in message 300 does not match the MAC addresses stored in respective memories 208c-n of devices 200c-n. In a "unicast" system, device 200a may send a message 300 directly to device 200b.

In a system such as a broadcast system of FIG. 3, if a device 200a has to send a targeted message to each of devices 200b-n or to a group or subset of devices 200b-n, it has to individually address a message to each of the intended recipient devices 200b-n using their respective MAC addresses. Individually addressing and sending messages to each of the devices 200b-n has substantial overhead in terms of cost and time, especially if the number of devices 200 being addressed is very large, for example, millions of devices.

Embodiments of the invention presented herein provide methods, systems and computer program products that utilize "synthetic MAC" (synMAC) addresses to commonly address a group of devices. Embodiments presented herein circumvent the traditional messaging scheme that requires unique messages that address each device individually by its respective MAC address. According to an embodiment of the invention, an administrative device, for example, a cable modem termination system (CMTS), a master headend or a network server, may assign synthetic MAC addresses to devices under its administrative jurisdiction by signaling or sending a command message to the devices. In alternate embodiment, each device may be assigned multiple synMAC addresses at the time of manufacture by the manufacturer. In another embodiment, an end user of a device may install software that assigns synMAC addresses to the device. In yet another embodiment, an end user of a device may manually input synMAC addresses for a device. For example, the end user may program the device by inputting synMAC addresses via a keyboard of a computer. In an example, an end user may install software or firmware that allows the device to accept, parse and process messages including synMAC addresses. In an example, synMACs may be assigned based on the group(s) that a device belongs to as explained below with respect to FIG. 6.

Subsequent to assignment of synMAC addresses, an administrative device may message all devices or subsets of the devices by sending a message including a common group synMAC address(es) to each of the desired group of devices as opposed to individually addressing each of the devices within a group. FIGS. 4-8 illustrate examples that utilize synthetic MAC addresses according to embodiments of the invention.

Figure 4:
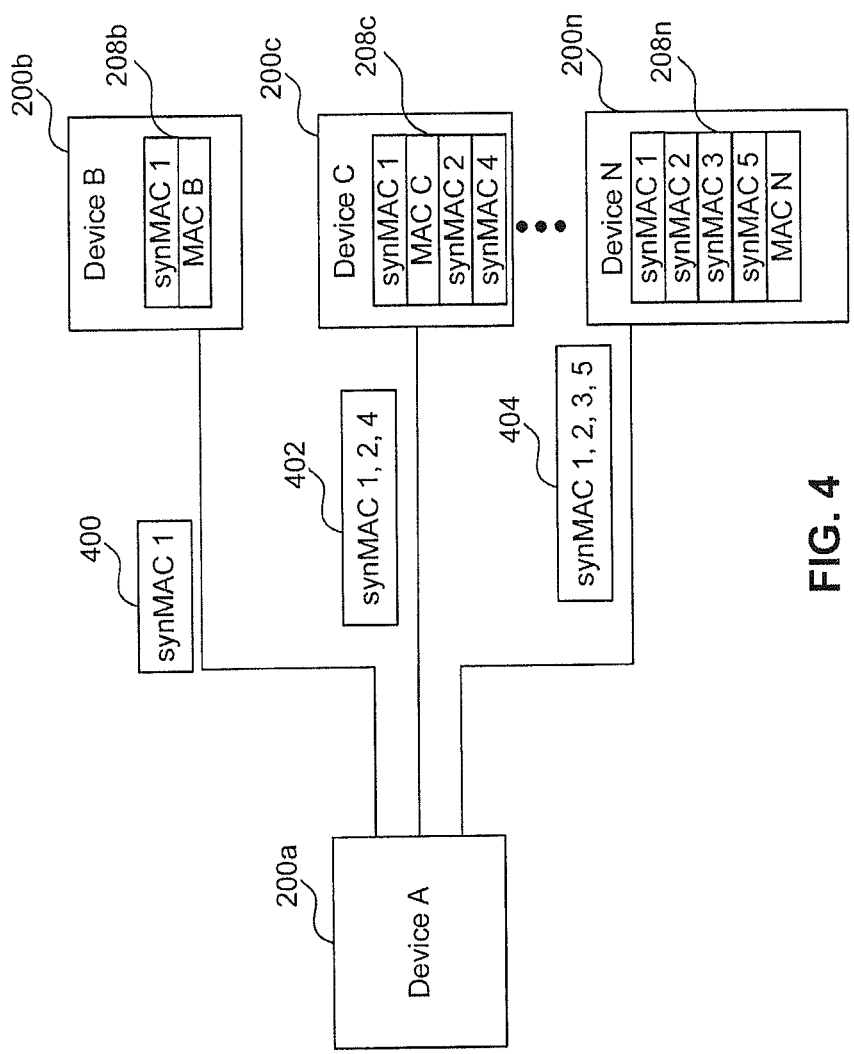
FIG. 4 illustrates example synMAC address assignments according to an embodiment of the invention.

FIG. 4 illustrates example synMAC address assignments according to an embodiment of the invention.

In the present example, device 200a sends a message 400 assigning synMAC 1 to device 200b. Device 200a sends a message 402 assigning synMAC 1, synMAC 2 and synMAC 4 to device 200c and a message 404 assigning synMAC 1, synMAC 2, synMAC 3 and synMAC 5 to device 200n. Device 200b stores synMAC 1 in memory 208b; device 200c stores synMAC 1, synMAC 2, and synMAC 4 in memory 208c and device 200n stores synMAC 1, synMAC 2, synMAC 3 and synMAC 5 in memory 208n.

According to an embodiment, systems that utilize MAC address parsing and filtering protocols may be extended using software to allow for synMAC address parsing and processing in addition to MAC address processing. In an embodiment, software processes parse messages that include synMAC addresses with no changes required to the hardware of the receiving device and no changes to the communication model (e.g. OSI model) or other protocol in use. synMAC messaging may be encapsulated in an existing communication protocols which utilize unique MAC addressing. In an embodiment, prior to assigning the synMAC addresses to devices 200b-n, device 200a may install software in devices 200b-n that allows devices 200b-n to accept, parse and process messages that use an synMAC addressing scheme. In an alternate embodiment, software to process messages including synMAC addresses may be pre-installed by a manufacturer at the time of manufacture or be installed by an end user of the device.

synMAC addressing schemes utilize the small size and rapid processing of MAC addressing schema while allowing for duplicate or common synMACs. In an example, synMAC addressing schemes may utilize MAC address formatting but are not bound to any other rules related to MAC addressing. The use of common synMAC addresses allows for adhoc groupings to be created as described below with respect to FIGS. 5 and 6.

Figure 5A:
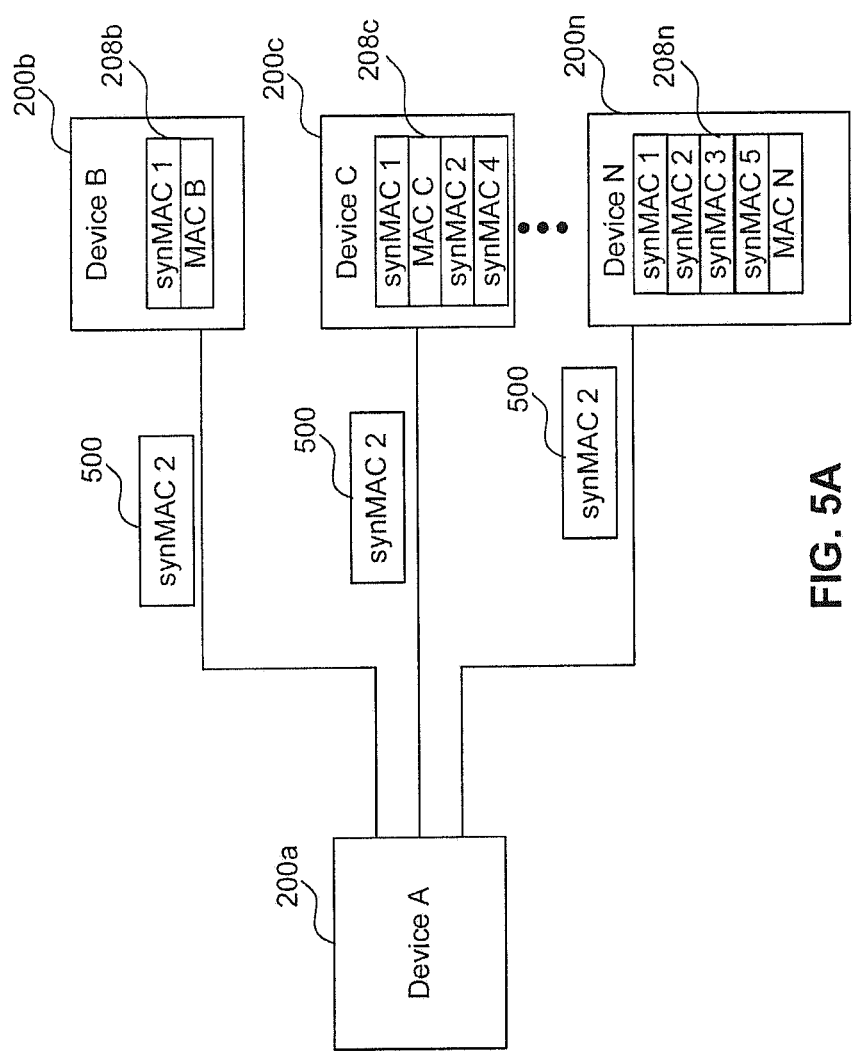
FIG. 5A illustrates an example of messaging using synthetic MAC addresses according to an embodiment of the invention.

FIG. 5A illustrates an example of messaging using synthetic MAC addresses according to an embodiment of the invention.

In the present example, device 200a broadcasts a message 500 that includes an address synMAC 2 to devices 200b-n. Device 200c and device 200n are associated with synMAC 2 since device 200c stores synMAC 2 in memory 208c and device 200n stores synMAC 2 in memory 208n as described above with respect to FIG. 4. Since device 200c and device 200n are associated with synMAC 2, device 200c and device 200n accept message 500. Device 200b rejects message 500 since it does not store synMAC 2 in memory 208b and is therefore not associated with synMAC 2. Thus, as shown in FIG. 5A, multiple devices can be messaged simultaneously using a group addressing scheme thereby avoiding the overhead of individually addressing each device within a group.

It is also to be appreciated that messages with synMAC addresses may be sent to devices that do not implement a synMAC addressing scheme and may only implement MAC addressing schemes. Devices that do not implement synMAC addressing schemes will drop messages that include synMAC addresses. Thus device 200a may send messages with MAC addresses or synMAC addresses to devices 200b-n.

Figure 5B:
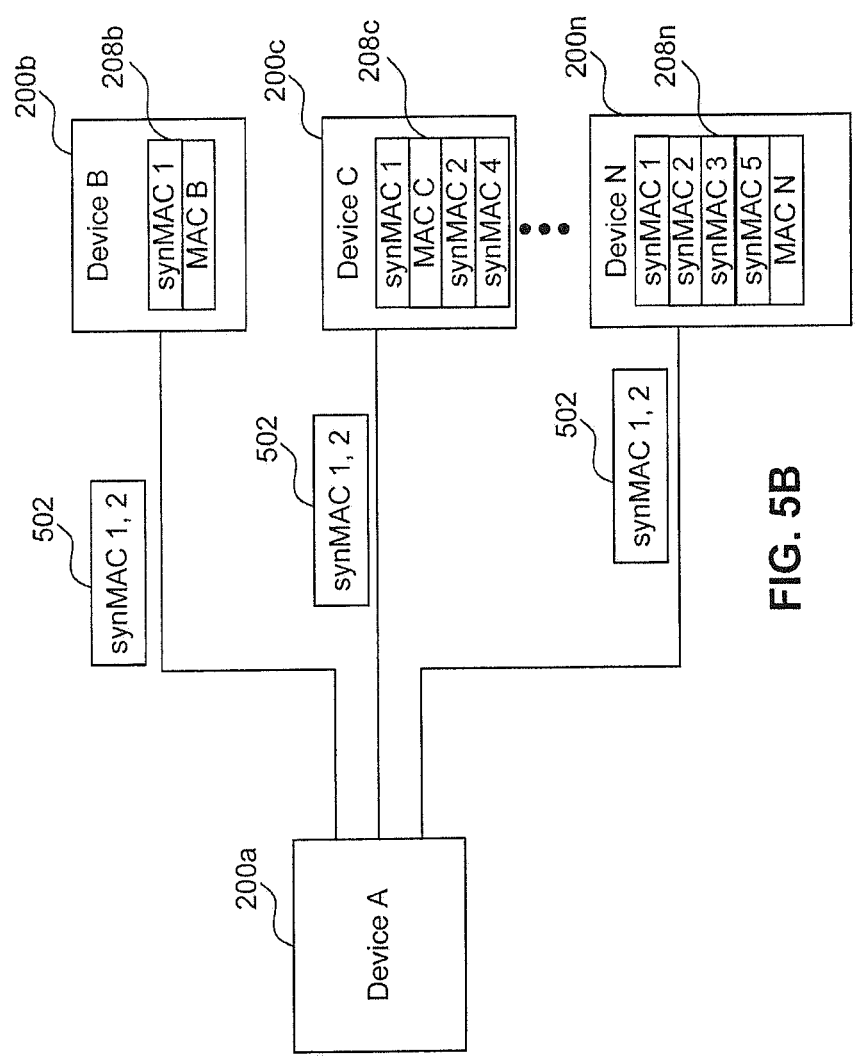
FIG. 5B illustrates a further example of messaging using synthetic MAC addresses according to an embodiment of the invention.

FIG. 5B illustrates a further example of messaging using synthetic MAC addresses according to an embodiment of the invention.

In the present example, device 200a broadcasts a message 502 including synMAC1 and synMAC 2 to devices 200b-n. Device 200c and device 200n accept message 502 since both devices 200c and 200n have been assigned synMAC 1 and synMAC 2 are store synMAC 1 and synMAC 2 in memories 208c and 208n respectively as described above with reference to FIG. 4. Device 200b rejects message 502 since it is associated with synMAC 1 only and is not associated with both synMAC 1 and synMAC 2. Thus, as in the example in FIG. 5B synthetic MAC addresses can be used for group signaling and can instantiate arbitrary predetermined external and/or internal rules to accept, parse and process synMAC messages.

In an example, a message may include multiple synMAC addresses with a separate action associated with each synMAC address. For example, message 502 includes synMAC 1 and synMAC 2 where each synMAC may be associated with corresponding actions. Each synMAC address may also be associated with a priority level. For example synMAC 1 may be associated with priority level A and synMAC 2 may be associated with priority level B. If a device 200 includes more than one synMAC address that corresponds to more than one synMAC address in the received message, then device 200 will execute the action associated with synMAC address having the higher priority level. For example, if priority level A is higher than priority level B, device 200 will perform the action associated with synMAC 1. If, the synMAC addresses have the same priority level, then device 200 will execute actions associated with both synMAC addresses.

In a further embodiment, a synMAC address may be used for data encryption. For example, a message may include an encrypted value that is a logical XOR of a synMAC address and a MAC address of a destination device 200. When the destination device 200 receives the encrypted value, it will XOR the encrypted value with its own MAC address to decrypt the encrypted value and obtain a decrypted synMAC. If the decrypted synMAC matches a synMAC stored in the device's memory, then the message is deemed authentic.

In yet another embodiment, synMAC addresses and their combinations may indicate an action that is to be performed by a device 200. For example, if a message includes synMAC 1, then a destination device 200 is to turn itself off. If a message includes both synMAC 1 and synMAC 2, then the destination device 200 may reboot itself. It is to be appreciated that the types of functions to be executed and the combination of synMACs is a design choice and may be arbitrary.

FIG. 6 illustrates an example of synMAC address groupings.

FIG. 6 illustrates a table 600 that includes example synMAC address groupings for devices controlled by an administrative device such as device 200a. According to table 600, synMAC 1 is assigned to all devices in a Denver office, synMAC 2 is assigned to devices in an Atlanta office, synMAC 3 is assigned to all printers, synMAC 4 is assigned to all cable modems, synMAC 5 is assigned to all devices and synMAC 6 is assigned to a selective grouping of devices in Denver and Atlanta. It is to be appreciated that the groupings and assignments in table 600 are exemplary and may be arbitrarily based on design choices.

In an embodiment, table 600 may be stored in memory 208a of an administrative device, such as device 200a. In an example, table 600 may be a programmable table which can be updated via software. Device 200a may lookup table 600 to assign synMACs to devices 200b-n. Device 200a may also lookup table 600 to determine the combination of synMAC addresses to be used to address a specific group of devices. For example, to send a message or a software update to only cable modems in the Denver office, device 200a may broadcast a message that includes both synMAC 1 and synMAC 3. In this example all other devices, excepts cable modems in Denver, will discard the incoming message. Thus instead of individually sending a message addressed to each cable modem in the Denver Office, the present example allows for sending a group message that includes only synMAC 1 and synMAC 2.

In another example, to send a message all printers, an administrative device may broadcast a message that includes only synMAC 3. In this example, only printers will accept the incoming message. If the administrative device broadcasts a message that includes synMAC 2 and synMAC 5, then all devices in the Atlanta office will accept the incoming message. As can be seen in these above examples, the embodiments herein allow, for example, an upgrade of software or status of multiple devices by broadcasting a message that has one or more synMAC addresses as opposed to broadcasting messages with unique MAC addresses for each device as may be required in conventional systems.

It is to be appreciated that the term "message" as referred to herein may refer to, including but not limited to, commands, signals and packets. The message may be, for example, a software update, a message for display or any type of communication between two devices. The type of communication or means for communication between devices 200 may be arbitrary and is a design choice.

In an example, device 200a is an administrative system such as a cable modem headend and devices 200b-n are cable modems. In another example, device 200a may be a network server and devices 200b-n may be, for example, WiFi devices, laptops, Personal Digital Assistants (PDAs), cellular phones or any computational device. It is to be appreciated that devices 200 may be any type communication device and may use any type of communication protocol.

In the above examples, only an administrative device such as device 200a sends messages devices 200b-n using synMAC addresses. In other examples, devices 200b-n may also communicate with each other using synMAC addresses. For example, device 200b may broadcast a message including an synMAC address to devices 200a and 200c-n.

Figure 7:
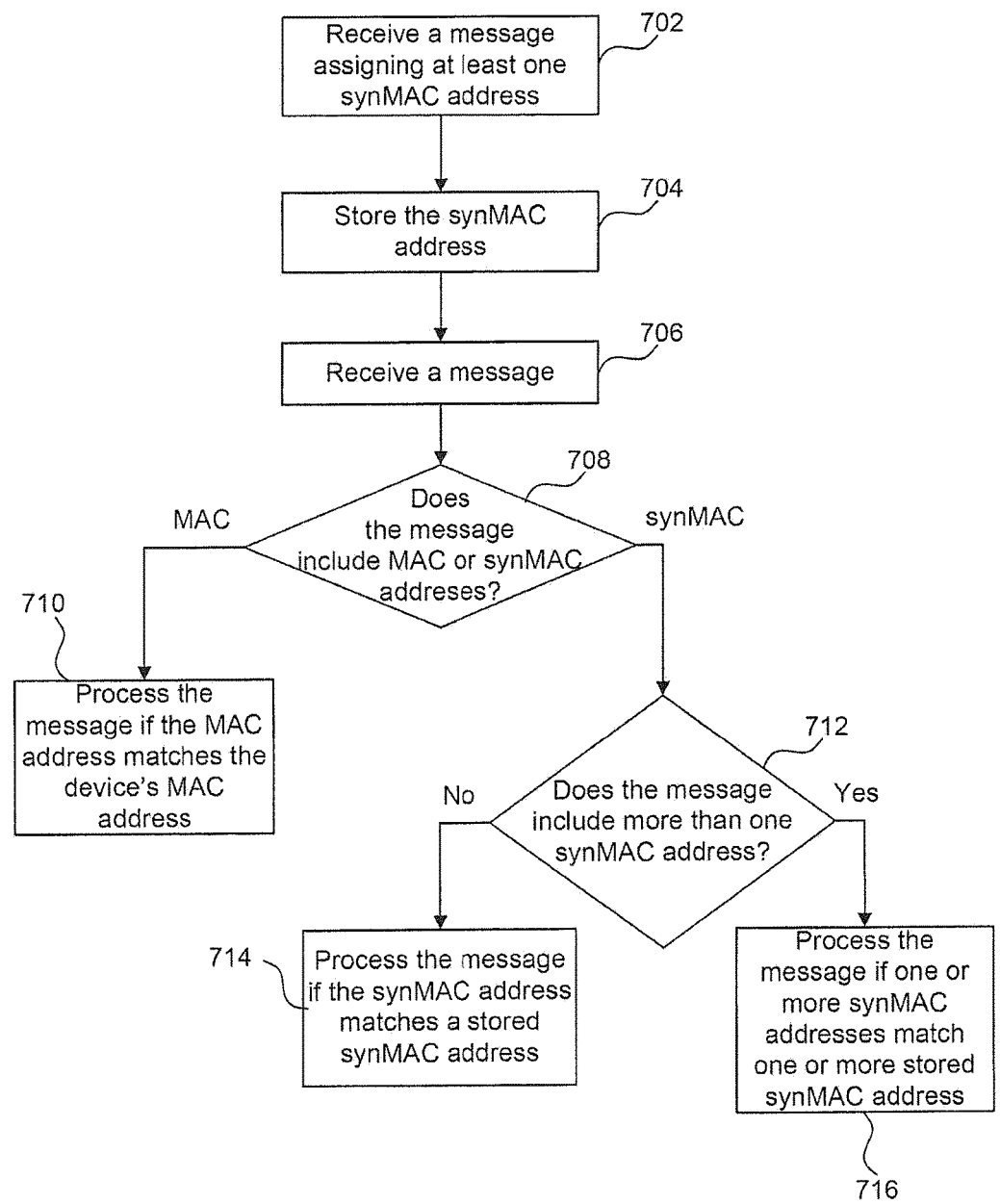
FIG. 7 illustrates an example flowchart depicting steps to receive and process messages including synthetic MAC addresses according to an exemplary embodiment.

FIG. 7 illustrates an example flowchart 700 depicting steps to receive and process messages including synthetic MAC addresses according to an exemplary embodiment. Flowchart 700 will be described with reference to the example operating environment depicted in FIGS. 1-6. However, the flowchart is not limited to these embodiments. Note that some steps shown in flowchart 700 do not necessarily have to occur in the order shown. In an example, the steps of flowchart 700 are performed by one or more of devices 200b-n.

In step 702, a message that assigns at least one synMAC address is received. For example, device 200c may receive a message 402 from device 200a that assigns synMAC 1, synMAC 2 and synMAC 4 to device 200c as shown in FIG. 4.

In step 704, the synMAC address is stored. For example, device 200c stores synMAC addresses synMAC 1, synMAC 2 and synMAC 4 assigned by device 200a in memory 208c as shown in FIG. 4.

In step 706, a message is received. For example, device 200c may receive a message 502 from device 200a as shown in FIG. 5B.

In step 708, it is determined whether the message includes a MAC address or a synMAC address. If the device includes a MAC address, then control proceeds to step 710. If the device includes an synMAC address then control proceeds to step 712.

In step 710, the message is processed using conventional MAC address processing. For example, if the MAC address in the message matches a MAC address stored in the receiving device then the message is accepted. If the MAC address in the message does not match a MAC address stored in the receiving device then the message is discarded.

In step 712, it is determined whether the message includes more than one MAC address. If the message includes a single MAC address then control proceeds to step 714. If the message includes multiple MAC addresses then control proceeds to step 716.

In step 714, it is determined whether the synMAC address in the message is equal to the synMAC address stored in memory. For example, device 200c determines whether synMAC 2 that is present in message 500 is also present in memory 208c includes as shown in FIG. 5A. If the synMAC address in the message matches the synMAC address in memory then the message is processed, otherwise the message is discarded.

In step 716, it is determined whether each synMAC address in the message matches synMAC addresses stored in memory. For example, device 200c determines whether memory 208c includes synMAC 1 and synMAC 2 that are present in message 502 as shown in FIG. 5B. If one or more of the synMAC addresses in the message match the syn-MAC addresses in memory, then the message processed, otherwise the message is discarded. In another embodiment, all the synMAC addresses in the message must match the synMAC addresses stored in memory 208c of device 200c. If none of the synMAC addresses match, then the message may be discarded According to an embodiment of the invention, in the case where each synMAC address is associated with an action, and if more than one synMAC address matches more than one of the synMAC addresses stored in memory 208c, then an action associated with the synMAC address having a higher priority is processed. If all matching synMAC addresses have the same priority level then actions associated with each matching synMAC address are processed. For example, if synMAC 1 has a priority level of A and synMAC 2 has a priority level of B, then if a device 200 receives a message having synMAC 1 and 2 and memory 208 of the device 200 also has both synMAC 1 and 2, then the action (for example downloading certain code) associated with synMAC 1 will be performed and the action associated with synMAC 2 (for example rebooting device 200) will not be performed if priority level A is higher than priority level B. Thus, if contradictory synMAC addresses in a message match the synMAC addresses in a memory of a receiving device, then the contradictions may be resolved through predetermined logical processing techniques (such as process the message if all synMACs match, or process if the internal priority assignment of synMAC 1 is greater than the priority assignment of synMAC n).

Figure 8:
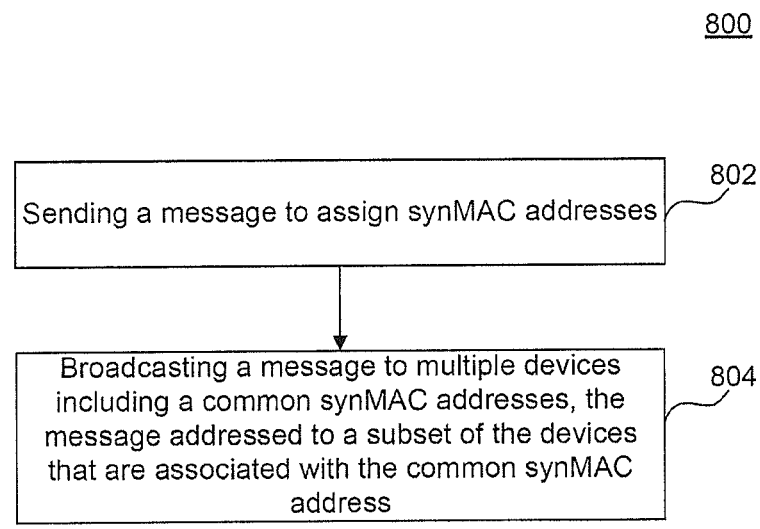
FIG. 8 illustrates an example flowchart depicting steps performed by an administrative device to assign synthetic MAC addresses and message devices using synthetic MAC addresses according to an exemplary embodiment.

FIG. 8 illustrates an example flowchart 800 depicting steps performed by an administrative device according to an exemplary embodiment. Flowchart 800 will be described with reference to the example operating environment depicted in FIGS. 1-6. However, the flowchart is not limited to these embodiments. Note that some steps shown in flowchart 800 do not necessarily have to occur in the order shown. In an example, the steps of flowchart 800 are performed by device 200a.

In step 802, one or more messages are sent to assign one or more synMAC addresses to devices. For example, device 200a sends a message 400 assigning synMAC 1 to device 200b; a message 402 assigning synMAC 1, synMAC 2 and synMAC 4 to device 200c, and a message 404 assigning synMAC 1, synMAC 2, synMAC 3 and synMAC 5 to device 200n as shown in FIG. 4.

In step 804, a message including one or more common synMAC addresses is broadcast to multiple devices where the message is addressed to a subset of the devices that are associated with the synMAC addresses in the message. For example, as shown in FIG. 5B, message 502 including synMAC 1 and synMAC 2 is broadcast to devices 200b-n, where the message is addressed to devices 200b and 200n that include synMAC 1 and synMAC 2.

Embodiments presented herein, or portions thereof, can be implemented in hardware, firmware, software, and/or combinations thereof.

The embodiments presented herein apply to any communication system between two or more devices or within subcomponents of one device. The representative functions described herein (e.g. steps in flowchart 7 and 8) can be implemented in hardware, software, or some combination thereof. For instance, the steps of flowcharts 7 and 8 can be implemented using computer processors, such as processors 202, MAC interface 204, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 9:
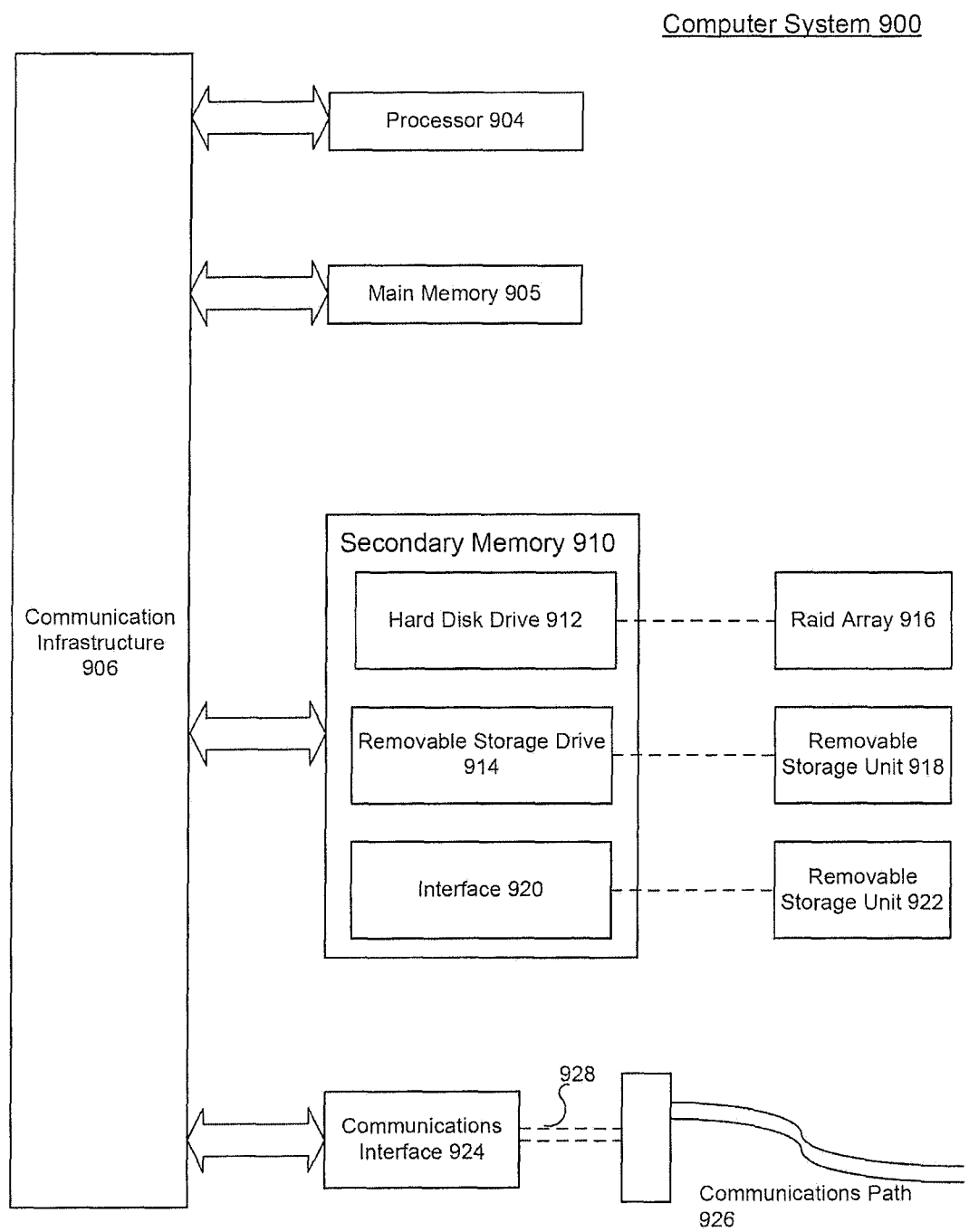
FIG. 9 is a block diagram of a computer system on which the present invention can be implemented.

The following describes a general purpose computer system that can be used to implement embodiments of the invention presented herein. The present invention can be implemented in hardware, or as a combination of software and hardware. Consequently, the invention may be implemented in the environment of a computer system or other processing system. An example of such a computer system 900 is shown in FIG. 9. The computer system 900 includes one or more processors, such as processor 904. Processor 904 can be a special purpose or a general purpose digital signal processor. The processor 904 is connected to a communication infrastructure 906 (for example, a bus or network). Various software implementations are described in terms of this exemplary computer system. After reading this description, it will become apparent to a person skilled in the relevant art how to implement the invention using other computer systems and/or computer architectures.

Computer system 900 also includes a main memory 905, preferably random access memory (RAM), and may also include a secondary memory 910. The secondary memory 910 may include, for example, a hard disk drive 912, and/or a RAID array 916, and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. As will be appreciated, the removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCM-CIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path 926. Communications path 926 carries signals 928 and may be implemented using wire or cable, fiber optics, a phone line, a cellular phone link, an RF link and other communications channels.

The terms "computer program medium" and "computer usable medium" are used herein to generally refer to media such as removable storage drive 914, a hard disk installed in hard disk drive 912, and signals 928. These computer program products are means for providing software to computer system 900.

Computer programs (also called computer control logic) are stored in main memory 908 and/or secondary memory 910. Computer programs may also be received via communications interface 924. Such computer programs, when executed, enable the computer system 900 to implement the present invention as discussed herein. In particular, the computer programs, when executed, enable the processor 904 to implement the processes of the present invention. For example, when executed, the computer programs enable processor 904, processor 202 or MAC interface 204 to implement part of or all of the steps described above with reference to FIGS. 7 and 8. Where the invention is implemented using software, the software may be stored in a computer program product and loaded into computer system 900 using raid array 916, removable storage drive 914, hard drive 912 or communications interface 924.

In other embodiments, features of the invention are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

What is claimed is:

1. A device, comprising:
    a memory; and
    a processor coupled to the memory and configured, based on instructions stored in the memory, to:
        receive a first message assigning a first synthetic Media Access Control (synMAC) address and a second synMAC address to the device,
        store the first synMAC address and the second synMAC address in the memory,
        receive a second message, and
        process the second message when the second message includes the first synMAC address or the second synMAC address.

2. The device of claim 1, wherein the first synMAC address and the second synMAC addresses are distinct from a Media Access Control (MAC) address of the device.

3. The device of claim 1, wherein the processor, based on the instructions, is further configured to receive and to process a third message to install software that causes the processor to parse messages that include the first synMAC address or the second synMAC address.

4. The device of claim 1, wherein the processor, based on the instructions, is further configured to:
    receive a third message, and
    process the third message when the third message includes a Media Access Control (MAC) address of the device.

5. The device of claim 1, wherein the processor, based on the instructions, is further configured to:
    receive a third message, and
    discard the third message when the third message does not include the first synMAC address, the second synMAC address, or a Media Access Control (MAC) address of the device.

6. The device of claim 1, wherein the second message includes the first synMAC address and the second synMAC address,
    wherein the first synMAC address is associated with a first action and the second synMAC address is associated with a second action, and
    wherein the processor, based on the instructions, is further configured to execute the first action before the second action when the first synMAC address is associated with a higher priority level than the second synMAC address.

7. The device of claim 1, wherein the second message includes the first synMAC address and the second synMAC address,
    wherein the first synMAC address is associated with a first action and the second synMAC address is associated with a second action, and
    wherein the processor, based on the instructions, is further configured to execute the first action and not the second action when the first synMAC address is associated with a higher priority level than the second synMAC address.

8. The device of claim 1, wherein the second message includes the first synMAC address and the second synMAC address,
wherein the first synMAC address is associated with a first action and the second synMAC address is associated with a second action, and
wherein the processor, based on instructions in the memory, is further configured to execute the first action and the second action when the first synMAC address and the second synMAC address are associated with a same priority level.

9. A method in a device, the method comprising:
receiving a first message assigning a first synthetic Media Access Control (synMAC) address and a second synMAC address to the device;
storing the first synMAC address and the second synMAC address in a memory of the device;
receiving a second message; and
processing the second message when the second message includes the first synMAC address or the second synMAC address.

10. The method of claim 9, wherein the first and the second synMAC addresses are distinct from a Media Access Control (MAC) address of the device.

11. The method of claim 9, further comprising receiving and processing a third message to install software that causes the processor to parse messages that include the first synMAC address or the second synMAC address.

12. The method of claim 9, further comprising:
receiving a third message, and
processing the third message when the third message includes a Media Access Control (MAC) address of the device.

13. The method of claim 9, further comprising:
receiving a third message, and
discarding the third message when the third message does not include the first synMAC address, the second synMAC address, or a Media Access Control (MAC) address of the device.

14. The method of claim 9, wherein the receiving the second message comprises:
receiving the second message including the first synMAC address and the second synMAC address, and
executing a first action associated with the first synMAC address before a second action associated with the second synMAC address when the first synMAC address is associated with a higher priority level than the second synMAC address.

15. The method of claim 9, wherein the receiving the second message comprises:
receiving the second message including the first synMAC address and the second synMAC address, and
executing a first action associated with the first synMAC address and not a second action associated with the second synMAC address when the first synMAC address is associated with a higher priority level than the second synMAC address.

16. The method of claim 9, wherein the receiving the second message comprises:
receiving the second message including the first synMAC address and the second synMAC address, and
executing a first action associated with the first synMAC address and a second action associated with the second synMAC address when the first synMAC address and the second synMAC address are associated with a same priority level.

17. A device, comprising:
a memory; and
a processor coupled to the memory and configured, based on instructions stored in the memory, to:
receive a first message assigning a synthetic Media Access Control (synMAC) address to the device,
store the synMAC address in the memory,
receive a second message, and
process the second message when the second message includes the synMAC address or a Media Access Control (MAC) address associated with the device.

18. The device of claim 17, wherein the synMAC address is distinct from the MAC address.

19. The device of claim 17, wherein the processor, based on the instructions, is further configured to receive and to process a third message to install software that causes the processor to parse messages that include the synMAC address.

20. The device of claim 17, wherein the processor, based on the instructions, is further configured to:
receive a third message, and
discard the third message when the third message does not include the synMAC address or the MAC address.

21. A system, comprising:
a memory; and
a processor coupled to the memory and configured, based on instructions stored in the memory, to:
assign a first identifier to a first group of devices of a plurality of devices,
assign a second identifier to a second group of devices of the plurality of devices, and
send a message including the first identifier to the first group of devices and to the second group of devices, the first identifier being configured such that the message is accepted by the first group of devices and is discarded by the second group of devices.

22. The system of claim 21, wherein the processor is further configured to group the first group of devices or the second group of devices based on geographic location or device type.

* * * * *

UNITED STATES PATENT AND TRADEMARK OFFICE
CERTIFICATE OF CORRECTION

PATENT NO. : 9,942,194 B1
APPLICATION NO. : 15/596481
DATED : April 10, 2018
INVENTOR(S) : Silver It is certified that error appears in the above-identified patent and that said Letters Patent is hereby corrected as shown below:

On the Title Page

In the Figure, for Tag "708", Line 4, delete "addreses?" and insert -- addresses? --, therefor.

In the Drawings

On Sheet 7 of 9, Figure 7, for Tag "708", Line 4, delete "addreses?" and insert -- addresses? --, therefor.

On Sheet 9 of 9, Figure 9, delete " 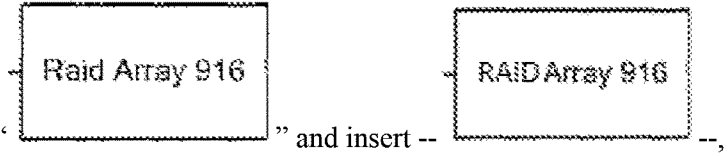 " and insert -- 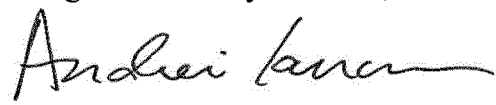 --, therefor.

In the Specification

In Column 1, Line 20, delete "media access control" and insert -- Media Access Control --, therefor.

In Column 1, Line 49, delete "example" and insert -- an example --, therefor.

In Column 2, Lines 51-52, delete "local area network (LAN) or metropolitan area network" and insert -- Local Area Network (LAN) or Metropolitan Area Network --, therefor.

In Column 3, Line 11, delete "wide area network" and insert -- Wide Area Network --, therefor.

In Column 3, Line 15, delete "Link" and insert -- Line --, therefor.

Signed and Sealed this
Eighteenth Day of June, 2019

Andrei Iancu
*Director of the United States Patent and Trademark Office*

CERTIFICATE OF CORRECTION (continued)
U.S. Pat. No. 9,942,194 B1

In Column 3, Lines 46-47, delete "cable modem termination system" and insert -- Cable Modem Termination System --, therefor.

In Column 4, Line 5, delete "example" and insert -- an example --, therefor.

In Column 4, Line 24, delete "(e.g." and insert -- (e.g., --, therefor.

In Column 4, Line 30, delete "an synMAC" and insert -- a synMAC --, therefor.

In Column 5, Line 5, delete "synMAC1" and insert -- synMAC 1 --, therefor.

In Column 6, Line 9, delete "excepts" and insert -- except --, therefor.

In Column 6, Line 51, delete "an synMAC" and insert -- a synMAC --, therefor.

In Column 7, Line 11, delete "an synMAC" and insert -- a synMAC --, therefor.

In Column 7, Line 44, delete "discarded" and insert -- discarded. --, therefor.

In Column 8, Line 14, delete "200c," and insert -- 200c; --, therefor.

In Column 8, Line 31, delete "(e.g." and insert -- (e.g., --, therefor.

In Column 8, Line 31, delete "flowchart" and insert -- flowcharts --, therefor.

In Column 8, Line 34, delete "processors" and insert -- processor --, therefor.

In Column 8, Lines 35-36, delete "application specific circuits (ASIC)," and insert -- Application Specific Integrated Circuits (ASICs), --, therefor.

In Column 8, Line 59, delete "random access memory" and insert -- Random Access Memory --, therefor.

In Column 9, Line 51, delete "raid" and insert -- RAID --, therefor.

In Column 9, Line 51, delete "hard" and insert -- hard disk --, therefor.